United States Patent [19]

Sakai et al.

[11] Patent Number: 4,933,106

[45] Date of Patent: Jun. 12, 1990

[54] HIGHLY CONDUCTIVE POLYMER COMPOSITION AND PROCESS FOR PRODUCING THE SAME

[75] Inventors: Toshiyuki Sakai; Masao Kobayashi, both of Tokyo, Japan

[73] Assignee: Showa Denko Kabushiki Kaisha, Tokyo, Japan

[21] Appl. No.: 125,416

[22] Filed: Nov. 25, 1987

[30] Foreign Application Priority Data

Nov. 27, 1986 [JP] Japan .................. 61-280865

[51] Int. Cl.$^5$ .................................. D01B 1/02
[52] U.S. Cl. .................. 252/500; 204/59 R; 204/59 F
[58] Field of Search .................. 252/500; 524/80; 525/279; 204/59 R, 59 F

[56] References Cited

U.S. PATENT DOCUMENTS 4,552,927  11/1985  Warren .................. 525/279

FOREIGN PATENT DOCUMENTS 104726   4/1984  European Pat. Off. .
2124635  2/1984  United Kingdom .
2134125  8/1984  United Kingdom .

*Primary Examiner*—Josephine Barr
*Attorney, Agent, or Firm*—Sughrue, Mion, Zinn, Macpeak & Seas

[57] ABSTRACT

A highly conductive polymer composition can be obtained by doping a neutralized conductive polymer having a $\pi$-electron conjugated structure with an anionic polymer electrolyte. The conductive polymer composition is stable for a long period of time, and the content of the dopant in the polymer composition can be freely controlled. A process for producing the polymer composition is also disclosed.

16 Claims, No Drawings

HIGHLY CONDUCTIVE POLYMER COMPOSITION AND PROCESS FOR PRODUCING THE SAME

FIELD OF THE INVENTION

This invention relates to a highly conductive polymer composition which is useful as cells, condensers, electrodes of display elements, electrochromic display element materials, tabular heating units, and electromagnetic shielding materials in the field of electric and electronic industry.

BACKGROUND OF THE INVENTION

Requirements for various kinds of conductive materials used in the field of electric and electronic industry have become severe, and materials which can be made small and light and have long term stability and high performance have been desired.

Highly conductive polymers which satisfy such requirements have been developed extensively in recent years, and many applications of these polymers have been described in, for example, European Pat. No. 203,438 and West German Pat. Nos. 3,409,655 and 3,307,954.

As examples of stable conductive polymers there may be mentioned heterocyclic polymers such as polythiophene, polypyrrole, etc., and not only scientific analysis was directed to such stable conductive polymers, but also many investigations were carried out from the aspect of industrial application. For instance, their use as the electrode materials for secondary cells or the electrochromic materials was proposed.

As the process for producing the conductive polymers there are known a process for chemical polymerization as described in European Pat. No. 182,548 and a process for electrochemical polymerization as described in West German Pat. Nos. 3,533,252 and 183,053, and they are chosen depending on the application of the polymers.

The conductive polymers, however, have low electrical conductivity in a neutral state, so that, in order to obtain a relatively high electrical conductivity of more than 1 S/cm, an electron acceptor (or an electron donor), so-called "dopant", is necessarily added to chemically or electrochemically react with the polymers, as described in West German Pat. No. 3,518,886 and U.S. Pat. Nos. 4,499,007 and 4,657,985.

Various electron acceptors are known, such as protonic acids (e.g., various kinds of halogen, metal halides, p-toluenesulfonic acid, etc.) and oxidizing agents (e.g., tetracyanoquinodimethane, chloranil, etc.). They have relatively low molecular weight and are adapted for use in the conductive polymers to perform reversible oxidation-reduction reaction, so-called "doping and dedoping", such as electrode materials for secondary cells or electrochromic materials. However, they are not suitable for use in the system where stable conductive state is required for a long period of time as in condenser electrodes, transparent conductive films, etc.

Under the circumstance, it has been proposed to use a polymer electrolyte as the dopant. For instance, one process comprises producing polypyrrole by electrochemical polymerization in the presence of a polyanion (e.g., polyvinylsulfuric acid anion, polystyrenesulfonic acid anion, etc.) together with an electrolyte, whereby the polyanion is captured by the conductive polymer, as described in Shimizu et al., the pre-printed papers for the Meeting of High Polymer Society, Vol. 34, No. 10, p. 2829 (1985). It is described that the polyanion captured is almost immobile, so that it is considered that this contributes to the stabilization of the conductive state. According to this process, however, the content of the dopant is limited depending on the polymerization condition and it cannot be freely controlled. Another process is that a film of polyanion is prepared and then a conductive polymer is compounded therewith, for instance, as described in Shimizu et al., the pre-printed papers for the Meeting of High Polymer Society, Vol. 34, No. 10, p. 2825 (1985). This process also has a defect that the content of dopant cannot be freely controlled as in the above-described process.

SUMMARY OF THE INVENTION

An object of this invention is to provide a novel highly conductive polymer composition which is stable in the doped state for a long period of time.

Another object of this invention is to provide a process for producing the highly conductive polymer composition wherein the content of the dopant can be freely controlled.

That is, this invention relates to a highly conductive polymer composition comprising a neutralized conductive polymer having a $\pi$-electron conjugated structure and having doped therein an anionic polymer electrolyte.

Also, this invention relates to a process for producing a highly conductive polymer composition by subjecting a neutralized conductive polymer having a $\pi$-electron conjugated structure to electrochemical doping with an anionic polymer electrolyte.

DETAILED DESCRIPTION OF THE INVENTION

The conductive polymer used in this invention is a high molecular weight compound having a $\pi$-electron conjugated structure, such as polyacetylene, polyparaphenylene, polypyrene, polyazulene, polyfluorene, polyphenylenevinylene, polynaphthalenevinylene, polypyrrole, polythiophene, poly-3-methylthiophene, polythienylpyrrole, polythienylvinylene, polyaniline, polyisothianaphthene, or polymers of derivatives of the monomers constituting the above polymers or copolymers of the monomers.

Examples of the derivatives of the monomers include metaphenylene, an N-alkylpyrrole (the alkyl group having preferably 1 to 20 carbon atoms and more preferably 1 to 10 carbon atoms; e.g., N-methylpyrrole and N-ethylpyrrole), an N-arylpyrrole (the aryl group having preferably 6 to 20 carbon atoms and more preferably 6 to 10 carbon atoms), a monohalogen-substituted or dihalogen-substituted pyrrole having the substituent(s) at carbon atom(s), N-phenylpyrrole, N-tolylpyrrole, 3-methylthiophene, ortho- or metatoluidine, xylidine, ortho- or metaanisidine, 2,5-dimethoxyaniline, 2,5-diethoxyaniline, 3,5-dimethoxyaniline, 2,6-dimethoxyaniline, 2-methylaniline, 2-methoxyaniline, o-phenylenediamine, 3-methyl-1,2-diaminobenzene, diphenylamine, triphenylamine, 5-methylisothianaphthene, 5,6-dimethylisothianaphthene, benzazulene, etc.

Further, the conductive polymers used in this invention may be copolymers of the monomers constituting the above-described polymers or the derivatives of the monomers and other comonomers such as cyclopentadiene, fulvene, indene, imidazole, thiazole, furan, etc.

The comonomer may be contained up to 50 mol% and preferably not more than 30 mol% in the copolymer.

Among these conductive polymers, polythiophene, poly-3-methylthiophene, polypyrrole, polyisothianaphthene, and polyaniline are preferred, and polyisothianaphthene is particularly preferred. These conductive polymers may be used either alone or in the form of a composite film with other thermoplastic resin.

The conductive polymer of the present invention can be produced by electrochemical polymerization of the monomers or the derivatives thereof with or without the comonomers to deposit in the form of film on an electrode or by chemical polymerization. The electrochemical polymerization is preferred since the polymer film on the electrode is electrochemically doped with ease. When the chemical polymerization is performed, the resulting powdery product can be electrochemically doped by first compression-molding the product to pelletize, providing a lead on the pellet and then subjecting the pellet to electrochemical doping.

The anionic polymer electrolytes used in this invention are polymer compounds hitherto known which contain anionic groups, and typical examples thereof include polyacrylic acid, polymethacrylic acid, polyvinylsulfuric acid, polyvinylsulfonic acid, polystyrenesulfonic acid, poly-$\alpha$-methylsulfonic acid, polyethylenesulfonic acid, polyglutamic acid, polyaspartic acid, polyphosphoric acid (including those having a polymerization degree of two or more), alginic acid, pectinic acid, fluorine-based polymers containing sulfonic acid groups or carboxylic acid groups, etc. The anionic polymer electrolyte preferably has a molecular weight of 350 or higher.

The fluorine-based polymers containing sulfonic acid groups or carboxylic acid groups are those obtained, for example, by copolymerizing a fluorinated alkene preferably having 2 to 20 carbon atoms (e.g., tetrafluoroethylene) and perfluorinated monomers (e.g., straight or branched chain alkenes) containing a sulfonic acid group or a carboxylic acid group, and they are commercially available as the industrial products. An illustrative of such commercial product is Nafion (trade name) of Du Pont Co.

Further, the anionic polymer electrolytes used in this invention may be copolymers of monomers constituting the above anionic polymer electrolytes with comonomers containing no anionic group. Examples of the comonomers containing no anionic group include styrene, methyl methacrylate, acrylonitrile, vinylidene chloride, vinyl chloride, vinyl acetate, etc.

Among these anionic polymer electrolytes preferred are polyphosphoric acid, fluorine-based polymers containing sulfonic acid groups or carboxylic acid groups, and polyacrylic acid. Polyphosphoric acid is particularly preferred when the conductive polymer is polyisothianaphthene.

The conductive polymer having a $\pi$-electron conjugated structure can be electrochemically doped with an anionic polymer electrolyte by, for example, a process wherein the conductive polymer having a $\pi$-electron conjugated structure is used as work electrode of an electrolytic cell provided with an opposite electrode and a reference electrode, while an electrolytic solution therefor is prepared by dissolving the anionic polymer electrolyte in a solvent capable of moderately swelling the conductive polymer. The concentration of the anionic polymer electrolyte in the electrolytic solution is preferably from $1 \times 10^{-4}$ to 10 mol/l. Suitable electric potential applied to the work electrode is generally from $-2.5$ to 10.0 V vs Ag/Ag$^+$, and preferably from $-1.5$ to $+3.0$ V vs Ag/Ag$^+$. There is no particular limitation to the solvent, but an electrochemically stable solvent is preferably used, such as acetonitrile, propylene carbonate, nitromethane, sulfolane, acetone, 2-methyl-2-pentanone, benzonitrile, tetrahydrofuran, dimethylsulfoxide, dimethylformamide, N-methylpyrrolidone, hexamethylphosphoramide, pyridine, etc. Water can also be used as the solvent when the anionic polymer electrolyte is water-soluble.

Prior to the electrochemical doping, it is important to fully neutralize the conductive polymer having a $\pi$-electron conjugated structure. Especially in the case where the conductive polymer was prepared by electrochemical polymerization, oxidation potential of the monomers is higher than that of the resulting conductive polymer having a $\pi$-electron conjugated structure, so that doping of low molecular weight anions of supporting electrolytes such as BF$_4^-$ and ClO$_4^-$ usually occurs simultaneously with the formation of the polymer film. Therefore, it is necessary to carry out a neutralization treatment set forth below.

The neutralization of the conductive polymer can be effected by the following treatments, but the present invention is not limited thereto. (i) A reverse potential is applied to the polymer film obtained by the electrochemical polymerization in an electrolytic cell. (ii) The polymer film obtained by the electrochemical polymerization or a pellet of the polymer obtained by the chemical polymerization is used as a work electrode with an opposite electrode of graphite or platinum, and voltage is applied between the electrodes in an electrolytic cell while controlling the potential of the polymer film or pellet to be neutral by monitoring a reference electrode. A solvent used in the electrolytic cell may be the same as those used in the electrochemical doping, and any supporting electrolytes can be used regardless of their molecular weight. Thereafter, the thus-treated polymer film or pellet is washed with the above solvent. (iii) The polymer is treated with a reducing agent such as ammonia and an alkali solution of, e.g., NaOH, KOH, etc., in a gaseous or liquid phase. (iv) When the polymer is unstable in the doped state with a low molecular weight anion, it is immersed in the above solvent to remove the anion.

The term "neutralized" used herein means the state that the content of anion doped in the conductive polymer having a $\pi$-electron conjugated structure is reduced to not more than 0.03 mol, preferably not more than 0.01 mol, per mol of monomer unit constituting the conductive polymer (hereafter referred to as "mol/mol-monomer unit").

In the case where a conductive polymer which has not been neutralized is electrochemically doped with an anionic polymer electrolyte, the amount of dopant the conductive polymer can retain is limited, and in addition, since the conductive polymer has been doped with a low molecular weight dopant, the doping amount of the polymer electrolyte is restricted when doping with the polymer electrolyte. Further, the conductive polymer composition thus obtained has poor stability.

There is no particular limitation with respect to the temperature and pressure in the electrochemical doping of the anionic polymer electrolyte, and it is usually carried out at ordinary temperature and pressure. When the electrochemical doping is carried out, the potential can be applied in any manner. For example, the potential may be increased to a predetermined level either gradually or at a stretch, or with repeating the doping and dedoping. The completion of electrochemical doping wherein an equilibrium state is reached at that potential may be confirmed by tracing the change in electric current, namely, by watching whether the current has become feeble or not.

The doping amount of the anionic polymer electrolyte in the conductive polymer having a $\pi$-electron conjugated structure varies depending on the kind of conductive polymer, and there maybe a conductive polymer doped with 1 mol of the dopant per mol of the monomer unit constituting the polymer. The doping amount is preferably from 0.05 to 0.15 mol/mol-monomer unit in the case of polyacetylene, from 0.10 to 0.35 mol/mol-monomer unit in polypyrrole, from 0.10 to 0.35 mol/mol-monomer unit in polythiophene, from 0.15 to 0.50 mol/mol-monomer unit in polyaniline, and from 0.05 to 0.20 mol/mol-monomer unit in polyisothianaphthene.

The highly conductive polymer composition of this invention possesses the following advantages as compared with conventional compositions which are prepared by doping with a low molecular weight dopant. (1) Since an immobile polymer electrolyte is used as the dopant, natural dedoping rarely occurs even when they are preserved in the doped state for a long period of time, so that the highly conductive state can be maintained stably for a long period of time. Such an effect is especially remarkable when the conductive polymer having a $\pi$-electron conjugated structure is polyisothianaphthene in the form of film, and it is possible to maintain stably the characteristic property of polyisothianaphthene that it is colorless and transparent in a doped state. (2) The anionic polymer electrolyte also functions as a binder and, as a result, the mechanical characteristics of the highly conductive polymer composition can be improved. (3) When a potential is applied onto the highly conductive polymer composition, the dopant which is an ionic species is immobile, so that the internal polarization is small.

Further, the highly conductive polymer composition of this invention possesses the following advantages as compared with polymer compositions whose dopant is a polymer electrolyte but prepared by a conventional process. (1) The content of the dopant can be freely controlled by adjusting the potential at the work electrode when the electrochemical doping is carried out. (2) A composition containing only a polymer electrolyte as a dopant can be readily obtained. (3) The kind of polymer electrolyte can be freely chosen. (4) The uniformity in the dispersed state of the dopant can be improved.

This invention will be explained with reference to the Examples, but the present invention should not be construed as being limited thereto.

EXAMPLE 1

Using as a work electrode an indium tin oxide (ITO) glass plate having a surface resistance of 15 $\Omega$/sq and as an opposite electrode a graphite plate heat-treated with oxidizing flame, the electrochemical polymerization of isothianaphthene was carried out in an acetonitrile solution containing 0.15 mol/l of isothianaphthene and 0.05 mol/l of tetraphenylphosphonium chloride (supporting electrolyte) at a polymerization temperature of 25° C. and a constant inter-electrode potential of 1.5 V. The amount of the isothianaphthene polymerized was adjusted to 20 mC/cm$^2$ by controlling the quantity of electricity supplied. As a result, blue polyisothianaphthene was deposited on the ITO glass plate within a few minutes. After immersion of the deposited ITO glass plate in acetonirtile for removal of electrolytes for production of polyisothianaphthene, the deposited ITO glass plate was used as a work electrode with a platinum plate as an opposite electrode in an electrolytic cell, and cyclic voltammetry was carried out 5 times in an acetonitrile solution containing polyphosphoric acid at a concentration of 0.1 mol/l, at a potential of $-0.6$ to $+0.5$ V against an Ag/Ag$^+$ reference electrode and at a rate of 20 mV/S. The residual anion content in the polyisothianaphthene thus treated was 0.01 mol/mol-monomer unit. Thereafter, the potential was kept at $+0.5$ V vs Ag/Ag$^+$ for 30 minutes, whereby Cl$^-$ ion which was doped at the time of polymerization was released, and the polyphosphoric acid ion was electrochemically doped. The polyisothianaphthene on the ITO glass plate, which was doped with polyphosphoric acid ion by electrochemical doping, was immersed in acetonitrile for removal of the electrolytic solution, and then dried in vacuo. The resulting material had changed, from blue at the time of polymerization, to be colorless and transparent. The doping amount of the polyphosphoric acid ion was 0.10 mol/mol-monomer unit. The polyisothianaphthene on the ITO glass plate was still colorless and transparent even when preserved in argon for 30 days.

COMPARATIVE EXAMPLE 1

Except that an acetonitrile solution containing 0.5 mol/l of p-toluenesulfonic acid was used in place of the acetonitrile solution containing 0.1 mol/l of polyphosphoric acid, the same procedure was repeated as in Example 1, whereby Cl$^-$ ion which was doped at the time of polymerization was released and the p-toluenesulfonic acid ion was electrochemically doped in the polyisothianaphthene. The polyisothianaphthene on the ITO glass plate was immersed in acetonitrile for removal of the electrolytic solution and then dried in vacuo. The resulting material had changed, from blue at the time of polymerization, to be colorless and transparent. The doping amount of p-toluenesulfonic acid ion was 0.10 mol/mol-monomer unit. When the polyisothianaphthene on the ITO glass plate was preserved in argon for 3 days, however, it colored blue.

COMPARATIVE EXAMPLE 2

The same procedure as in Example 1 was repeated, except that the polyisothianaphthene deposited on the ITO glass plate was used as a work electrode without removing the electrolyte for production of polyisothianaphthene, and the polyphosphoric acid ion was electrochemically doped in the polyisothanaphthene which had a residual anion content of 0.08 mol/mol-monomer unit, merely by maintaining the potential constant at $+0.5$ V vs Ag/Ag$^+$ for 30 minutes. As a result, it was found that the polyisothianaphthene on the ITO glass plate preserved in argon for one day returned to blue completely, showing poor stability.

EXAMPLE 2

By hot pressing commercially available 110 $\mu$m-thick polyvinyl chloride films on both sides of a platinum plate, a good coated electrode having no pin-holes was prepared. The electrochemical polymerization of isothianaphthene was carried out using the coated electrode as a work electrode and a graphite plate heat-treated with oxidizing flame as an opposite electrode, wherein a mixed solution of 90 vol% of acetonitrile containing 0.15 mol/l of isothianaphthene and 0.05 mol/l of tetraphenylphosphonium chloride and 10 vol% of tetrahydrofuran was used as an electrolytic solution, the polymerization temperature was 25° C., and the interelectrode potential was constant at 2.0 V. The amount of the isothianaphthene polymerized was adjusted to 20 mC/cm$^2$ by controlling the quantity of electricity supplied. Within a few minutes a blue composite film of polyisothianaphthene and polyvinyl chloride was obtained on the platinum plate. After immersion of the product in acetonitrile for removal of the electrolyte for production of polyisothianaphthene, the composite film was used as a work electrode with a platinum plate as an opposite electrode in an electrolytic cell, and cyclic voltammetry was carried out 5 times in a mixed solution of 90 vol% of acetonitrile containing 0.1 mol/l of polyphosphoric acid and 10 vol% of tetrahydrofuran, at a potential of $-0.6$ to $+0.5$ V against an Ag/Ag$^+$ reference electrode and at a rate of 1 mV/S. The residual anion content in the polyisothianaphthene was 0.01 mol/mol-monomer unit. Thereafter, by maintaining the potential at $+0.5$ V vs Ag-/Ag$^+$ for 30 minutes, Cl$^-$ ion which was doped at the time of polymerization was released and the polyphosphoric acid ion was electrochemically doped. The polyisothianaphthene-polyvinyl chloride composite film coated on the platinum plate, which was doped with polyphosphoric acid ion by electrochemical doping, was immersed in acetonitrile for removal of the electrolytic solution and then dried in vacuo. Next, the polyisothianaphthene-polyvinyl chloride composite film was peeled apart from the platinum plate. The polyisothianaphthene-polyvinyl chloride composite film which was blue at the time of polymerization became colorless and transparent when doped with polyphosphoric acid ion. The doping amount of polyphosphoric acid ion was 0.10 mol/mol-monomer unit. It was found that the composite film preserved in argon for 10 days was still colorless and transparent.

EXAMPLE 3

Using a polyisothianaphthene-polyvinyl chloride composite film coated on a platinum plate as prepared in the same manner as in Example 2 as a work electrode and a platinum plate as an opposite electrode, the same procedure as in Example 2 was repeated except that cyclic voltammetry was carried out 5 times in a mixed solution of 90 vol% of acetonitrile containing 0.05 mol/l of a fluorine-based polymer having sulfonic acid groups (a copolymer of tetrafluoroethylene and perfluoro-3,6-dioxa-4-methyl-7-octenesulfonyl fluoride; Nafion ® 117, manufactured by Du Pont Co.) in place of polyphosphoric acid and 10 vol% of tetrahydrofuran, at a potential of $-1.0$ to $+0.4$ V against an Ag-/Ag$^+$ reference electrode and at a rate of 1 mV/S. The resulting polyisothianaphthene had a residual anion content of 0.01 mol/mol-monomer unit. Therefore, the potential was maintained at $+0.4$ V vs Ag/Ag$^+$ for 30 minutes to obtain a polyisothianaphthene-polyvinyl chloride composite film. The polyisothianaphthene-polyvinyl chloride composite film which was blue at the time of polymerization became colorless and transparent when doped with the fluorine-based polymer ion having sulfonic acid groups. The doping amount was 0.10 mol/mol-monomer unit. The composite film preserved in argon for 10 days was also found to be colorless and transparent.

EXAMPLE 4

Using a polyisothianaphthene-polyvinyl chloride composite film coated on a platinum plate as prepared in the same manner as in Example 2 as a work electrode and a platinum plate as an opposite electrode, the same procedure as in Example 2 was repeated except that a mixed solution of 90 vol% of acetonitrile containing 0.05 mol/l of polyacrylic acid in place of polyphosphoric acid and 10 vol% of tetrahydrofuran was used as an electrolytic solution, and in this solution the potential was applied at $-0.6$ to $+0.5$ V against an Ag/Ag$^+$ reference electrode for 30 minutes to obtain a polyisothianaphthene-polyvinyl chloride composite film. The polyisothianaphthene-polyvinyl chloride composite film which was blue at the time of polymerization became colorless and transparent when doped with polyacrylic acid ion. The doping amount was 0.10 mol/mol-monomer unit. The composite film preserved in argon for 10 days was found to be colorless and transparent.

EXAMPLE 5

Using as a work electrode an ITO glass plate having a surface resistance of 15 Ω/sq and as an opposite electrode a graphite plate heat-treated with oxidizing flame the electrochemical polymerization of 3-methylthiophene was carried out in a benzonitrile solution containing 0.5 mol/l of 3-methylthiophene and 0.05 mol/l of tetraethylammonium perchlorate, at a polymerization temperature of 25° C. and a constant current of 1 mA/cm$^2$. The amount of the 3-methylthiophene polymerized was adjusted to 0.15 C/cm$^2$ by controlling the quantity of electricity supplied. Blue poly-3-methylthiophene was deposited on the ITO glass plate within a few minutes. When this deposited material was immersed in acetonitrile for a night and a day and further in a 5 wt% ethanol solution of KOH for 1 hour, ClO$_4^-$ dopant was dedoped from the poly-3-methylthiophene and the color of the polymer changed from blue to red. The residual anion content in the polymer was 0.01 mol/mol-monomer unit. Using this material as a work electrode and a graphite plate heat-treated with oxidizing flame as an opposite electrode in an electrolytic cell, the potential was maintained constant at $+1.0$ V vs Ag/Ag$^+$ in an acetonitrile solution containing 0.1 mol/l of polyphosphoric acid for 30 minutes. By this treatment the polymer was electrochemically doped with the polyphosphoric acid ion, changing its color from red to blue. The doping amount of polyphosphoric acid ion was 0.20 mol/mol-monomer unit. When the poly-3-methylthiophene on the ITO glass plate was immersed in acetonitrile for a night and a day, but the color of the polymer did not change, and moreover, even when the polymer dried in vacuo was preserved in argon for 30 days, the bright red color remained unchanged.

While the invention has been described in detail and with reference to specific embodiments thereof, it will be apparent to one skilled in the art that various changes and modifications can be made therein without departing from the spirit and scope thereof.

What is claimed is:

1. A highly conductive polymer composition comprising:
   (A) a neutralized conductive polymer having a π-electron conjugated structure, wherein said neutralized conductive polymer is polyisothianaphthene or a polymer of an isothianaphthene derivative, and (B) a dopant which is an anionic polymer electrolyte, wherein said anionic polymer electrolyte is selected from the group consisting of polyacrylic acid, polymethacrylic acid, polyvinylsulfuric acid, polyvinylsulfonic acid, polystyrenesulfonic acid, poly-α-methylsulfuric acid, polyethylenesulfonic acid, polyglutamic acid, polyaspartic acid, polyphosphoric acid, alginic acid, pectinic acid, and a fluorine-based polymer containing a sulfonic acid group(s) or a carboxylic acid group(s), wherein said fluorine-based polymer containing a sulfonic acid group(s) or carboxylic acid group(s) is obtained by polymerizing a fluorinated alkene of 2 to 20 carbon atoms with a perfluorinated alkene containing a sulfonic acid group(s) or a carboxylic acid group(s), wherein said anionic polymer electrolyte is contained in said polymer composition in an amount of from 0.05 to 0.20 mol per mol of monomer unit of said neutralized conductive polymer.

2. A highly conductive polymer composition as claimed in claim 1, wherein said neutralized conductive polymer is polyisothianaphthene.

3. A highly conductive polymer composition as claimed in claim 2, wherein said anionic polymer electrolyte is polyphosphoric acid.

4. A process for producing a highly conductive polymer composition comprising the steps of:

(A) neutralizing a conductive polymer having a π-electron conjugated structure, wherein said neutralized conductive polymer is polyisothianaphthene or a polymer of an isothianaphthene derivative, (B) subjecting the resulting neutralized conductive polymer to electrochemical doping with an anionic polymer electrolyte, wherein said anionic polymer electrolyte is selected from the group consisting of polyacrylic acid, polymethacrylic acid, polyvinylsulfuric acid, polyvinylsulfonic acid, polystyrenesulfonic acid, poly-α-methylsulfuric acid, polyethylenesulfonic acid, polyglutamic acid, polyaspartic acid, polyphosphoric acid, alginic acid, pectinic acid, and a fluorine-based polymer containing a sulfonic acid group(s) or a carboxylic acid group(s), wherein said fluorine-based polymer containing a sulfonic acid group(s) or carboxylic acid group(s) is obtained by polymerizing a fluorinated alkene of 2 to 20 carbon atoms with a perfluorinated alkene containing a sulfonic acid group(s) or a carboxylic acid group(s), wherein said anionic polymer electrolyte is contained in said polymer composition in an amount of from 0.05 to 0.20 mol per mol of monomer unit of said neutralized conductive polymer.

5. A process as claimed in claim 4, wherein said neutralized conductive polymer is polyisothianaphthene.

6. A process as claimed in claim 5, wherein said anionic polymer electrolyte is polyphosphoric acid.

7. A polymer composition according to claim 1, wherein said neutralized conductive polymer has an anion content of not more than 0.03 mols per mol of monomer unit constituting said neutralized conductive polymer prior to doping with said anionic polymer electrolyte.

8. A process according to claim 6, wherein said neutralized conductive polymer has an anion content of not more than 0.03 mols per mol of monomer unit constituting said neutralized conductive polymer prior to doping with said anionic polymer electrolyte.

9. A process as claimed in claim 4, wherein said electrochemical doping is carried out by using said neutralized conductive polymer as a work electrode of an electrolytic cell, adding to said cell an electrolytic solution prepared by dissolving said anionic polymer electrolyte in a solvent, and applying to said work electrode an electric potential of from $-2.5$ to $+3.0$ V against an Ag/Ag$^+$ reference electrode.

10. A process as claimed in claim 9, wherein said electric potential is from $-1.5$ to $+3.0$ V against an Ag/Ag$^+$ reference electrode.

11. A process as claimed in claim 9, wherein said solvent is selected from the group consisting of acetonitrile, propylene carbonate, nitromethane, sulfolane, acetone, 2-methyl-2-pentanone, benzonitrile, tetrahydrofuran, dimethylsulfoxide, dimethylformamide, N-methylpyrrolidone, hexamethylphosphoramide, pyridine and water.

12. A process as claimed in claim 9, wherein said anionic polymer electrolyte is present in said electrolytic solution at a concentration of from $1 \times 1^{-4}$ to 10 mol/l.

13. A polymer composition according to claim 1, wherein said derivative is selected from the group consisting of 5-methylisothianaphthene and 5,6-dimethylisothianaphthene.

14. A process according to claim 4, wherein said derivative is selected from the group consisting of 5-methylisothianaphthene and 5,6-dimethylisothianaphthene.

15. A polymer composition according to claim 1, wherein said neutralized conductive polymer is prepared by electrochemical polymerization.

16. A process according to claim 4, wherein said neutralized conductive polymer is prepared by electrochemical polymerization.

* * * * *